US008366804B2

(12) United States Patent
Liu et al.

(10) Patent No.: US 8,366,804 B2
(45) Date of Patent: Feb. 5, 2013

(54) HIGH PERMEANCE POLYIMIDE MEMBRANES FOR AIR SEPARATION

(75) Inventors: Chunqing Liu, Schaumburg, IL (US); Raisa Minkov, Skokie, IL (US); Syed A. Faheem, Huntley, IL (US); Travis C. Bowen, Crystal Lake, IL (US); Jeffrey J. Chiou, Irvine, CA (US)

(73) Assignee: UOP LLC, Des Plaines, IL (US)

( * ) Notice: Subject to any disclaimer, the term of this patent is extended or adjusted under 35 U.S.C. 154(b) by 326 days.

(21) Appl. No.: 12/790,095

(22) Filed: May 28, 2010

(65) Prior Publication Data

US 2011/0290112 A1 Dec. 1, 2011

(51) Int. Cl.
*B01D 53/22* (2006.01)
*B01D 71/64* (2006.01)
*C08G 73/10* (2006.01)

(52) U.S. Cl. ............. 95/45; 95/49; 95/50; 95/51; 95/54; 95/55; 96/4; 96/10; 96/11; 96/13; 96/14; 264/178 R; 264/183; 528/322

(58) Field of Classification Search .............. 96/4, 8, 96/10, 11, 13, 14; 95/45, 49, 50, 51, 52, 95/54, 55; 264/171.26, 178 R, 183; 528/322; 524/104, 107, 108
See application file for complete search history.

(56) References Cited

U.S. PATENT DOCUMENTS

| 4,080,744 | A | 3/1978 | Manos |
|---|---|---|---|
| 4,120,098 | A | 10/1978 | Manos |
| 7,048,846 | B2 | 5/2006 | White et al. |
| 7,422,623 | B2 | 9/2008 | Ekiner et al. |
| 7,998,246 | B2 | 8/2011 | Liu et al. |
| 2006/0011063 | A1 | 1/2006 | Zhou |
| 2008/0017029 | A1 | 1/2008 | Kase et al. |
| 2008/0134885 | A1* | 6/2008 | Yoshinaga et al. ........... 95/55 |
| 2008/0141858 | A1 | 6/2008 | Liu et al. |
| 2008/0141863 | A1 | 6/2008 | Liu et al. |
| 2008/0143014 | A1* | 6/2008 | Tang ............................. 264/216 |
| 2009/0297850 | A1 | 12/2009 | Jung et al. |
| 2010/0269698 | A1* | 10/2010 | Yates et al. ..................... 96/10 |

FOREIGN PATENT DOCUMENTS

KR 100782959 B1 11/2007

OTHER PUBLICATIONS

Shou, L et al., "Tuning the Gas Transport Performance of Carbon Molecular Sieve Membranes by the Morphological Changes of 6FDA/PMDA-TMMDA Precursors", In: Proceedings of Regional Symposium on Membrane Science and Technology 2004, Apr. 2004, Puteri Pan Pacific Hotel, Johor Bharu, Malaysia.*

Chung, Tai-Shung, "Limitations of using Flory-Huggins equation for the states of solutions during asymmetric hollow-fiber formation", Journal Membrane Sci., 1997, 126, 19.

Chung, Tai-Shung, "Breaking the Limitation of composition change during isothermal mass-transfer processes at the spinodal", Journal Membrane Sci., 1997, 130, 141-147.

Chung, Tai-Shung, "Effect of A r-Gap D stance on the Morphology and Thermal Properties of Polyethersulfone Hollow Fibers", Journal of. Appl. Polymer. Sci., 1997, 66, 1067.

* cited by examiner

*Primary Examiner* — Jason M Greene
(74) *Attorney, Agent, or Firm* — Mark Goldberg

(57) ABSTRACT

The present invention discloses a new type of polyimide membranes including hollow fiber and flat sheet membranes with high permeances for air separations and a method of making these membranes. The new polyimide hollow fiber membranes have $O_2$ permeance higher than 300 GPU and $O_2/N_2$ selectivity higher than 3 at 60° C. under 308 kPa for $O_2/N_2$ separation. The new polyimide hollow fiber membranes also have $CO_2$ permeance higher than 1000 GPU and single-gas selectivity for $CO_2/CH_4$ higher than 20 at 50° C. under 791 kPa for $CO_2/CH_4$ separation.

15 Claims, No Drawings

HIGH PERMEANCE POLYIMIDE MEMBRANES FOR AIR SEPARATION

BACKGROUND OF THE INVENTION

This invention relates to air separation membranes and more particularly to a new type of asymmetric polyimide membrane with high permeances for air separation.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. High performance polymers such as polyimides (PIs), poly(trimethylsilylpropyne), and polytriazole have been developed to improve membrane selectivity, permeability, and thermal stability. These polymeric membrane materials have shown promising intrinsic properties for separation of gas pairs such as $CO_2/CH_4$, $O_2/N_2$, $H_2/CH_4$, and propylene/propane ($C_3H_6/C_3H_8$).

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 GPU=$10^{-6}$ cm$^3$ (STP)/cm$^2$ s (cm Hg)), is the pressure normalized flux and equals to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, it is very complicated and tedious to make such asymmetric integrally skinned membranes having a defect-free skin layer. The presence of nanopores or defects in the skin layer reduces the membrane selectivity. Another type of commercially available gas separation polymer membrane is the thin film composite (or TFC) membrane, comprising a thin selective skin deposited on a porous support. TFC membranes can be formed from CA, polysulfone, polyethersulfone, polyamide, polyimide, polyetherimide, cellulose nitrate, polyurethane, polycarbonate, polystyrene, etc. Fabrication of TFC membranes that are defect-free is also difficult, and requires multiple steps. Yet another approach to reduce or eliminate the nanopores or defects in the skin layer of the asymmetric membranes has been the fabrication of an asymmetric membrane comprising a relatively porous and substantial void-containing selective "parent" membrane such as polysulfone or cellulose acetate that would have high selectivity were it not porous, in which the parent membrane is coated with a material such as a polysiloxane, a silicone rubber, or a UV-curable epoxysilicone in occluding contact with the porous parent membrane, the coating filling surface pores and other imperfections comprising voids. The coating of such coated membranes, however, is subject to swelling by solvents, poor performance durability, low resistance to hydrocarbon contaminants, and low resistance to plasticization by the sorbed penetrant molecules such as $CO_2$ or $C_3H_6$.

A particular use for gas separation membranes is in air separation such as in the nitrogen generation systems (NGS) needed to provide fuel tank inerting for commercial and military aircraft. Fuel tank inerting is the process of replacing potentially flammable gas in the space above the fuel in the fuel tank with a non-flammable atmosphere. Useful membranes for separating oxygen or nitrogen from air must have sufficient selectivity to distinguish between these similar sized gas molecules and must also have high permeance. Since permeance determines the size and weight of the air separation module and selectivity determines the purity of the product gas. Normally, air separation membranes are in the form of hollow fiber and are formed into hollow fiber modules. Hollow fiber polymer membranes used for gas separations particularly for air separation have the advantages of low cost, high area packing density, good flexibility, and self mechanical support. However, fabrication of hollow fiber membranes with both superior permeability and selectivity is always a challenge due to the complexity of spinning process. Hollow fiber polymer membranes with integrally skinned asymmetric membrane structure are normally fabricated by a dry-wet phase inversion technique. There are three major steps including spinning dope preparation, spinning, and coagulation (or phase inversion) for the formation of hollow fiber membranes using this technique. Chung et al. reported that air-gap distance and elongational stress played important roles on the hollow fiber formation and the mass-transfer fluxes and spinodal decomposition in Markoffian and Onsager's thermodynamic systems. Work reported by Chung et al. also suggested that the main parameters affecting hollow fiber formation are rheological properties of spinning solution, bore fluid chemistry and flow rate, external coagulant chemistry, spinning dope chemistry and flow rate, fiber take-up rate, shear stress within an annular orifice of the spinneret, spinneret design parameters, and spinneret temperature. See Chung, J. MEMBR. SCI., 1997, 126, 19; Chung, Teoh, J. MEMBR. SCI., 1997, 130, 141; Chung, Hu, J. APPL. POLYM. SCI., 1997, 66, 1067.

US 2006/0011063 disclosed a gas separation membrane formed from polyetherimide by extruding a hollow fiber using a core liquid. For the described membrane, like other asymmetric hollow fiber membranes, one polymer solution is spun from an annular spinneret and the core liquid is pumped into the center of the annulus.

US 2008/0017029 A1 disclosed an asymmetric hollow-fiber polyimide gas separation membrane, an improved tensile elongation at break of 15% or more as a hollow-fiber membrane itself, an oxygen gas permeation rate of 40 GPU or more and a gas ratio of permeation rate of oxygen to nitrogen of 4 or more measured at 50° C. In addition, this work taught an asymmetric hollow-fiber gas separation membrane obtained by heat-treating the asymmetric hollow-fiber gas separation membrane at a maximum temperature of from 350° to 450° C. The asymmetric hollow-fiber gas separation membrane has sufficient mechanical strength even after the heat-treatment at a maximum temperature of from 350° to 450° C.

US 2009/0297850 A1 disclosed a hollow fiber membrane derived from polyimide membrane, and the polyimide includes a repeating unit obtained from aromatic diamine including at least one ortho-positioned functional group with respect to an amine group and dianhydride.

U.S. Pat. No. 7,422,623 reported the preparation of polyimide hollow fiber membranes using annealed polyimide polymers, particularly polyimide polymers with low molecular weight sold under the trade name P-84. The polyimide polymers are annealed at high temperature from 140° to 180° C. for about 6 to 10 hours to improve the mechanical properties of the polymers. The resulting membranes prepared from the high temperature annealed polyimides are suitable for high pressure applications. This polymer annealing method, however, is not suitable for high molecular weight, easily thermally crosslinkable, or easily thermally decomposed polymer membrane materials.

The present invention provides a new type of polyimide hollow fiber and flat sheet membranes with high permeances for air separation and a method of making these membranes.

SUMMARY OF THE INVENTION

This invention pertains to a new type of polyimide flat sheet and hollow fiber membranes with high permeances for gas separations and a method of making these membranes.

This invention includes a further improved polyimide hollow fiber membrane with more than 50% higher $O_2$ permeance and similar $O_2/N_2$ selectivity compared to polyimide membranes previously disclosed. The present invention generally relates to air separation membranes and, more particularly, to high permeance polyimide hollow fiber membranes for air separation.

The present invention provides a new high permeance polyimide hollow fiber membrane for air separation. One polyimide hollow fiber membrane described in the present invention is fabricated from poly(3,3',4,4'-diphenylsulfone tetracarboxylic dianhydride-pyromellitic dianhydride-3,3',5, 5'-tetramethyl-4,4'-methylene dianiline) which is derived from the condensation reaction of 3,3',4,4'-diphenylsulfone tetracarboxylic dianhydride (DSDA, 80 mol-%) and pyromellitic dianhydride (PMDA, 20 mol-%) with 3,3',5,5'-tetramethyl-4,4'-methylene dianiline (TMMDA, 100 mol-%)). The polyimide spinning dope formulation comprises N-methylpyrrolidone (NMP) and 1,3-dioxolane. The new high permeance polyimide hollow fiber membrane described in the current invention has an asymmetric integrally skinned membrane structure comprising a thin nonporous selective skin layer on top of a porous support layer from the same polyimide material. The new polyimide hollow fiber membrane has super thin skin layer which results in high $O_2$ permeance.

The new polyimide hollow fiber membranes have $CO_2$ permeance higher than 1000 GPU and single-gas selectivity for $CO_2/CH_4$ higher than 20 at 50° C. under 791 kPa for $CO_2/CH_4$ separation. The new polyimide hollow fiber membranes have $O_2$ permeance higher than 300 GPU and $O_2/N_2$ selectivity higher than 3 at 60° C. under 308 kPa for $O_2/N_2$ separation. These polyimide hollow fiber membranes have much higher $O_2$ permeance and similar $O_2/N_2$ selectivity compared to previously known polyimide hollow fiber membranes for air separation.

In another embodiment of the invention, this invention pertains to high permeance polyimide hollow fiber membranes that have undergone an additional crosslinking step, by chemical or UV crosslinking or other crosslinking process as known to one skilled in the art. As an example, cross-linked poly(3,3',4,4'-diphenylsulfone tetracarboxylic dianhydride-pyromellitic dianhydride-3,3',5,5'-tetramethyl-4,4'-methylene dianiline) polyimide hollow fiber membranes can be prepared by UV cross-linking of the poly(3,3',4,4'-diphenylsulfone tetracarboxylic dianhydride-pyromellitic dianhydride-3,3',5,5'-tetramethyl-4,4'-methylene dianiline) polyimide hollow fiber membranes via UV radiation. The poly(3,3',4,4'-diphenylsulfone tetracarboxylic dianhydridepyromellitic dianhydride-3,3',5,5'-tetramethyl-4,4'-methylene dianiline) polyimide polymer used for the preparation of the polyimide hollow fiber membranes described in the current invention have UV cross-linkable sulfonic functional groups. The cross-linked polyimide hollow fiber membranes comprise polymer chain segments where at least part of these polymer chain segments are cross-linked to each other through possible direct covalent bonds by exposure to UV radiation. The cross-linking of the polyimide hollow fiber membranes provides the membranes with improved selectivities and slightly decreased permeances compared to the corresponding uncross-linked polyimide hollow fiber membranes.

The spinning dope formulation for the preparation of polyimide hollow fiber membranes with high permeances for gas separations in the present invention comprises N-methylpyrrolidone (NMP) and 1,3-dioxolane which are good solvents for the polyimide polymer. In some cases, the spinning dope formulation for the preparation of polyimide hollow fiber membranes with high permeances for gas separations in the present invention also comprises acetone and isopropanol which are poor solvents for the polyimide polymer. It is believed that the proper weight ratio of the solvents used in the present invention provides the polyimide hollow fiber membranes with <50 nm super thin nonporous selective skin layer which results in high permeances.

The new polyimide hollow fiber membranes with high permeances described in the current invention have an asymmetric integrally skinned membrane structure. In some cases, the selective skin layer surface of the polyimide hollow fiber membranes is coated with a thin layer of material such as a polysiloxane, a fluoropolymer, a thermally curable silicone rubber, or a UV radiation curable silicone rubber.

The invention provides a process for separating at least one gas from a mixture of gases using the new asymmetric polyimide membranes with high permeances described in the present invention, the process comprising: (a) providing an asymmetric polyimide membrane with high permeance described in the present invention which is permeable to said at least one gas; (b) contacting the mixture on one side of the asymmetric polyimide membrane with high permeance described in the present invention to cause said at least one gas to permeate the membrane; and (c) removing from the opposite side of the membrane a permeate gas composition comprising a portion of said at least one gas which permeated said membrane.

The new asymmetric polyimide membranes with high permeances of the present invention are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The membranes that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases: such as carbon dioxide from methane, nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including nitrogen enrichment from air, carbon dioxide removal from natural gas and biogas and in enhanced oil recovery.

The present invention provides a new type of polyimide hollow fiber and flat sheet membranes with high permeances and a method of making these membranes. This invention also pertains to the application of these polyimide hollow fiber and flat sheet membranes with high permeances for a variety of gas separations such as separations of $CO_2/CH_4$, $CO_2/N_2$, olefin/paraffin separations (e.g. propylene/propane separation), $H_2/CH_4$, $O_2/N_2$, iso/normal paraffins, polar molecules such as $H_2O$, $H_2S$, and $NH_3$/mixtures with $CH_4$, $N_2$, $H_2$, and other light gases separations, as well as for liquid separations such as desalination and pervaporation.

The spinning dope formulation for the preparation of polyimide hollow fiber membranes with high permeances for gas separations in the present invention comprises NMP and 1,3-dioxolane which are good solvents for the polyimide polymer. In some cases, the spinning dope formulation for the preparation of polyimide hollow fiber membranes with high permeances for gas separations in the present invention also comprises poor solvents for the polyimide polymer such as acetone, methanol, and isopropanol. It is believed that the proper weight ratio of the solvents used in the present invention provides the polyimide hollow fiber membranes with <50 nm super thin nonporous selective skin layer which results in high permeances.

The present invention provides a method for the production of polyimide hollow fiber membranes with high permeances by spinning the polyimide spinning dope described in the present invention via a dry-wet phase inversion technique to form hollow fibers followed by annealing the wet hollow fibers in hot water for a certain time. This approach comprises: (a) dissolving a polyimide polymer described in the present invention in a mixture of NMP and 1,3-dioxolane, or a mixture of NMP, 1,3-dioxolane, and non-solvents for the polymer such as acetone, and isopropanol to form a polyimide spinning dope; (b) spinning the polyimide spinning dope and a bore fluid simultaneously from an annular spinneret using a hollow fiber spinning machine wherein said bore fluid is pumped into the center of the annulus and wherein said polyimide spinning dope is pumped into the outer layer of the annulus; (c) passing the nascent polyimide hollow fiber membrane through an air gap between the surface of the spinneret and the surface of the nonsolvent coagulation bath to evaporate the organic solvents for a certain time to form the nascent polyimide hollow fiber membrane with a thin dense selective skin layer on the surface; (d) immersing the nascent polyimide hollow fiber membrane into the nonsolvent (e.g., water) coagulation bath at a controlled temperature which is in a range of 0° to 30° C. to generate the porous non-selective support layer below the thin dense selective skin layer by phase inversion, followed by winding up the polyimide hollow fibers on a drum, roll or other suitable device; (e) annealing the wet polyimide hollow fibers in a hot water bath at a certain temperature which is in a range of 70° to 100° C. for a certain time which is in a range of 10 minutes to 3 hours; and (f) drying the polyimide hollow fiber membrane at a certain temperature which is in a range of 50° to 150° C. In some cases, a solvent exchange step is added after the annealing step (e) and before the drying step (f) by a sequential solvent exchange with methanol and hexane as taught in U.S. Pat. Nos. 4,080,744 and 4,120,098. In some other cases a membrane post-treatment step can be added after step (f) to further improve the selectivity but does not change or damage the membrane, or cause the membrane to lose performance with time. The membrane post-treatment step can involve coating the selective layer surface of the polyimide hollow fiber membrane with a thin layer of material such as a polysiloxane, a fluoro-polymer, a thermally curable silicone rubber, or a UV radiation curable silicone rubber. The polyimide hollow fiber membrane made using this approach contains a super thin defect-free dense selective skin layer which is less than 50 nm on a porous non-selective layer and both layers are made from the same membrane material.

The new polyimide hollow fiber membranes have $CO_2$ permeance higher than 1000 GPU and single-gas selectivity for $CO_2/CH_4$ higher than 20 at 50° C. under 791 kPa for $CO_2/CH_4$ separation. The new polyimide hollow fiber membranes also have $O_2$ permeance higher than 300 GPU and $O_2/N_2$ selectivity higher than 3 at 60° C. under 308 kPa for $O_2/N_2$ separation. These polyimide hollow fiber membranes have much higher $O_2$ permeance and similar $O_2/N_2$ selectivity compared to previously known polyimide hollow fiber membranes for air separation.

The new polyimide hollow fiber membranes with high permeances described in the current invention have an asymmetric integrally skinned membrane structure.

In some cases, the polyimide hollow fiber membranes with high permeances undergo an additional crosslinking step, by chemical or UV crosslinking or other crosslinking process as known to one skilled in the art. The cross-linked polyimide hollow fiber membranes can be prepared by UV crosslinking of the polyimide hollow fiber membranes via UV radiation. Some polyimide polymers used for the preparation of the polyimide hollow fiber membranes with high permeances described in the current invention have UV cross-linkable functional groups such as benzophenone groups. The cross-linked polyimide hollow fiber membranes comprise polymer chain segments where at least part of these polymer chain segments are cross-linked to each other through possible direct covalent bonds by exposure to UV radiation. The cross-linking of the polyimide hollow fiber membranes provides the membranes with improved selectivities and slightly decreased permeances compared to the corresponding uncross-linked polyimide hollow fiber membranes with high permeances.

The polyimide polymers used for making the asymmetric polyimide membranes with high permeances described in the current invention may comprise a plurality of first repeating units of formula (I)

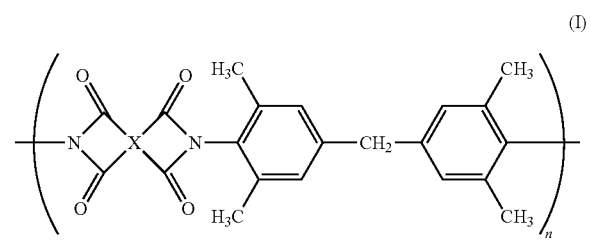

(I)

wherein X is selected from the group consisting of

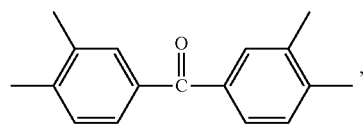

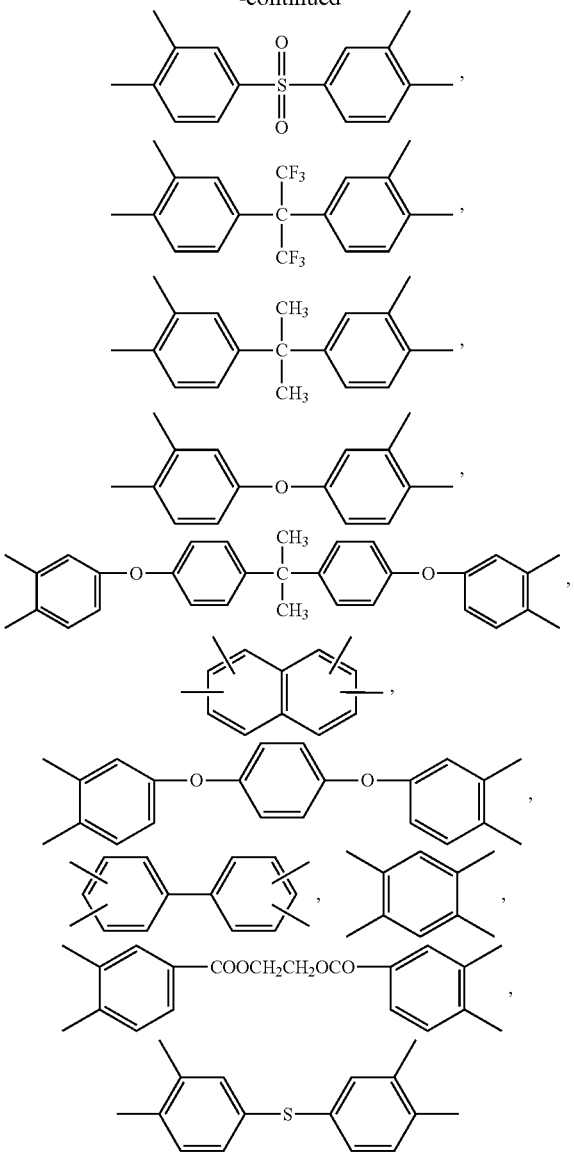

and mixtures thereof.

Some examples of polyimide polymers used for making the asymmetric polyimide membranes with high permeances described in the current invention may include, but are not limited to: poly(3,3',4,4'-diphenylsulfone tetracarboxylic dianhydride-3,3',5,5'-tetramethyl-4,4'-methylene dianiline) derived from the condensation reaction of 3,3',4,4'-diphenylsulfone tetracarboxylic dianhydride (DSDA) and 3,3',5,5'-tetramethyl-4,4'-methylene dianiline (TMMDA), referred to as poly(DSDA-TMMDA); poly(3,3',4,4'-diphenylsulfone tetracarboxylic dianhydride-pyromellitic dianhydride-3,3',5,5'-tetramethyl-4,4'-methylene dianiline) derived from the condensation reaction of 3,3',4,4'-diphenylsulfone tetracarboxylic dianhydride (DSDA, 80 mol-%) and pyromellitic dianhydride (PMDA, 20 mol-%) with 3,3',5,5'-tetramethyl-4,4'-methylene dianiline (TMMDA, 100 mol-%), referred to as poly(DSDA-PMDA-TMMDA); poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) derived from the condensation reaction of 3,3',4,4'-benzophenone tetracarboxylic dianhydride (BTDA, 25 mol-%), pyromellitic dianhydride (PMDA, 50 mol-%) and 4,4'-oxydiphthalic anhydride (ODPA, 25 mol-%) with 3,3',5,5'-tetramethyl-4,4'-methylene dianiline (TMMDA, 100 mol-%), referred to as poly(BTDA-PMDA-ODPA-TMMDA) or poly(3,3',4,4'-benzophenone tetracarboxylic dianhydride-pyromellitic dianhydride-3,3',5,5'-tetramethyl-4,4'-methylene dianiline) derived from the condensation reaction of 3,3',4,4'-benzophenone tetracarboxylic dianhydride (BTDA, 50 mol-%) and pyromellitic dianhydride (PMDA, 50 mol-%) with 3,3',5,5'-tetramethyl-4,4'-methylene dianiline (TMMDA, 100 mol-%), referred to as (poly(BTDA-PMDA-TMMDA); and poly(3,3',4,4'-benzophenone tetracarboxylic dianhydride-3,3',5,5'-tetramethyl-4,4'-methylene dianiline), derived from the condensation reaction of 3,3',4,4'-benzophenone tetracarboxylic dianhydride (BTDA, 100 mol-%) with 3,3',5,5'-tetramethyl-4,4'-methylene dianiline (TMMDA, 100 mol-%), referred to as poly(BTDA-TMMDA).

The polyimide membranes described in the present invention have an asymmetric structure with a thin nonporous dense selective skin layer supported on top of a porous non-selective support layer. These asymmetric polyimide membranes can be fabricated into any convenient geometry such as flat sheet (or spiral wound), disk, tube, hollow fiber, or thin film composite.

The invention provides a process for separating at least one gas from a mixture of gases using the new asymmetric polyimide membranes with high permeances described in the present invention, the process comprising: (a) providing an asymmetric polyimide membrane with high permeance described in the present invention which is permeable to said at least one gas; (b) contacting the mixture on one side of the asymmetric polyimide membrane with high permeance described in the present invention to cause said at least one gas to permeate the membrane; and (c) removing from the opposite side of the membrane a permeate gas composition comprising a portion of said at least one gas which permeated said membrane.

The polyimide hollow fiber membranes with high permeances described in the present invention are especially useful in the purification, separation or adsorption of a particular species in the liquid or gas phase. In addition to separation of pairs of gases, these polyimide hollow fiber membranes with high permeances described in the present invention may, for example, be used for the desalination of water by reverse osmosis or for the separation of proteins or other thermally unstable compounds, e.g. in the pharmaceutical and biotechnology industries. The polyimide hollow fiber membranes with super high permeances described in the present invention may also be used in fermenters and bioreactors to transport gases into the reaction vessel and transfer cell culture medium out of the vessel. Additionally, these polyimide hollow fiber membranes with high permeances described in the present invention may be used for the removal of microorganisms from air or water streams, water purification, ethanol production in a continuous fermentation/membrane pervaporation system, and in detection or removal of trace compounds or metal salts in air or water streams.

The polyimide hollow fiber membranes with high permeances described in the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the hollow polyimide hollow fiber membranes with high permeances described in the present invention. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the polyimide hollow fiber membranes with high permeances of the present invention will range from about −20° to about 100° C., and most preferably, the effective operating temperature of the membranes of the present invention will range from about 25° to about 100° C.

The polyimide hollow fiber membranes with high permeances described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which polyimide hollow fiber membranes with high permeances and described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The polyimide hollow fiber membranes with high permeances described in the present invention may incorporate a species that adsorbs strongly to certain gases (e.g. cobalt porphyrins or phthalocyanines for $O_2$ or silver (I) for ethane) to facilitate their transport across the membrane.

The polyimide hollow fiber membranes with high permeances described in the present invention also have immediate application to concentrate olefin in a paraffin/olefin stream for olefin cracking application. For example, the polyimide hollow fiber membranes with high permeances described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the polyimide hollow fiber membranes with high permeances described in the present invention is for separating isoparaffin and normal paraffin in light paraffin isomerization and MaxEne™, a process for enhancing the concentration of normal paraffin (n-paraffin) in the naphtha cracker feedstock, which can be then converted to ethylene.

The polyimide hollow fiber membranes with high permeances described in the present invention can also be operated at high temperature to provide the sufficient dew point margin for natural gas upgrading (e.g, $CO_2$ removal from natural gas). The polyimide hollow fiber membranes with high permeances described in the present invention can be used in either a single stage membrane or as the first or/and second stage membrane in a two stage membrane system for natural gas upgrading. The polyimide hollow fiber membranes with high permeances described in the present invention have high selectivity, high permeance, high mechanical stability, and high thermal and chemical stabilities that allow the membranes to be operated without a costly pretreatment system. Hence, a costly membrane pretreatment system such as a MemGuard™ system will not be required in the new process containing the polyimide hollow fiber membranes with high permeances described in the present invention. Due to the elimination of the pretreatment system and the significant reduction of membrane area, the new process can achieve significant capital cost saving and reduce the existing membrane footprint.

These polyimide hollow fiber membranes with high permeances described in the present invention may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using these polyimide hollow fiber membranes with high permeances described in the present invention is the deep desulfurization of gasoline and diesel fuels by a pervaporation membrane process similar to the process described in U.S. Pat. No. 7,048,846, incorporated by reference herein in its entirety. The polyimide hollow fiber membranes with high permeances described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using polyimide hollow fiber membranes with high permeances described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

While the present invention is particularly suited to the manufacture and use of hollow fiber membranes, it is within the scope of the invention to prepare and use flat sheet membranes using the compositions taught herein. Flat sheet membranes may be prepared according to standard manufacturing methods as known to those of skill in the art.

EXAMPLES

The following examples are provided to illustrate one or more preferred embodiments of the invention, but are not limited embodiments thereof. Numerous variations can be made to the following examples that lie within the scope of the invention.

Example 1

Preparation of polyimide hollow fiber membrane (PI-p) using poly(3,3',4,4'-diphenylsulfone tetracarboxylic dianhydridepyromellitic dianhydride-pyromellitic dianhydride-3,3',5,5'-tetramethyl-4,4'-methylene dianiline) derived from the condensation reaction of 3,3',4,4'-diphenylsulfone tetracarboxylic dianhydride (DSDA, 80 mol-%) and pyromellitic dianhydride (PMDA, 20 mol-%) with 3,3',5,5'-tetramethyl-4,4'-methylene dianiline (TMMDA, 100 mol-%) (abbreviated as poly(DSDA-PMDA-TMMDA))

A hollow fiber spinning dope containing 29.0 wt-% of poly(DSDA-PMDA-TMMDA) polyimide, 65.0 wt-% NMP, and 6.0 wt-% 1,3-dioxolane was prepared. The spinning dope was extruded at a flow rate of 0.7 mL/min through a spinneret at 50° C. spinning temperature. A bore fluid containing 10% by weight of water in NMP was injected to the bore of the fiber at a flow rate of 0.4 mL/min simultaneously with the extruding of the spinning dope. The nascent fiber traveled through an air gap length of 3 cm at room temperature with a humidity of 45%, and then was immersed into a water coagulant bath at 21° C. and wound up at a rate of 8.0 m/min. The water-wet fiber was annealed in a hot water bath at 85° C. for 30 minutes. The annealed water-wet fiber was then sequentially exchanged with methanol and hexane for three times and for 30 minutes each time, followed by drying at 100° C. in an oven for 1 hour to form PI-p hollow fiber membrane.

Example 2

Preparation of Polyimide Hollow Fiber Membrane (PI-g) Using Poly(DSDA-PMDA-TMMDA) Polymer The PI-g polyimide hollow fiber membrane was prepared using the same spinning dope and the spinning conditions as described in Example 1 except the fiber wound-up rate was 23.5 m/min and the fibers traveled through an air gap length of 15 cm. The fibers were annealed and dried by the procedures described in Example 1.

Example 3

Preparation of Polyimide Hollow Fiber Membrane (PI-wy) Using Poly(DSDA-PMDA-TMMDA) Polymer The PI-wy polyimide hollow fiber membrane was prepared using the same spinning dope and the spinning conditions as described in Example 1 except nascent fiber traveled through an air gap length of 10 cm at room temperature and immersed into a water coagulant bath at 8° C., and then wound up at a rate of 18.1 m/min. The fibers were annealed and dried by the procedures described in Example 1.

Example 4

Evaluation of the $O_2/N_2$ Separation Performance of PI-p, PI-g and PI-wy Hollow Fiber Membranes The PI-p, PI-g, and PI-wy hollow fibers were tested for $O_2/N_2$ separation at 60° C. under 308 kPa (30 psig) feed gas pressure with the feed on the bore-side of the hollow fibers. The results are shown in the following Table. It can be seen from the Table that all of the hollow fiber membranes described in the current invention showed $O_2$ permeances of over 400 GPU and $O_2/N_2$ selectivities over 3.

TABLE $O_2/N_2$ separation performance of PI-p, PI-g, and PI-wy hollow fiber membranes

| Hollow fiber membrane | $O_2$ permeance (GPU) | $O_2/N_2$ selectivity |
| --- | --- | --- |
| PI-p | 515.7 | 3.25 |
| PI-g | 481.3 | 4.16 |
| PI-wy | 412.5 | 3.89 |

(1 GPU = $10^{-6}$ cm$^3$ (STP)/cm$^2$ s (cm Hg))

The invention claimed is:

1. An asymmetric hollow fiber membrane formed from a polyimide comprising a plurality of repeating units of formula (I)

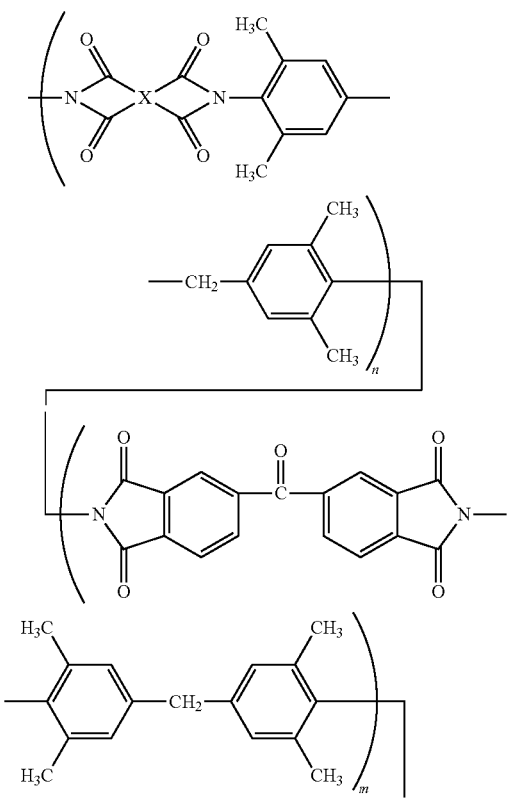
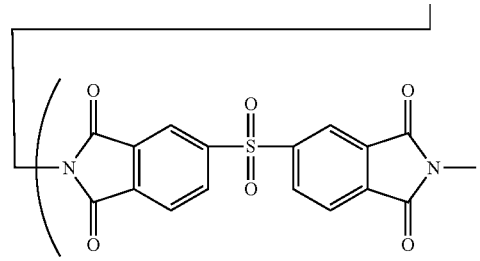
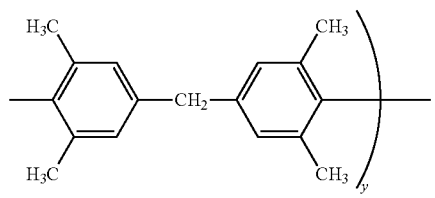

wherein X is selected from the group consisting of

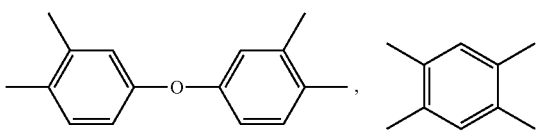

and mixtures thereof.

2. The asymmetric hollow fiber membrane of claim 1 wherein said polyimide is poly(3,3',4,4'-diphenylsulfone tetracarboxylic dianhydride-3,3',4,4'-benzophenone tetracarboxylic dianhydride-pyromellitic dianhydride-3,3',5,5'-tetramethyl-4,4'-methylene dianiline) derived from the condensation reaction of 3,3',4,4'-diphenylsulfone tetracarboxylic dianhydride (DSDA), 3,3',4,4-benzophenone tetracarboxylic dianhydride (BTDA), and pyromellitic dianhydride (PMDA) with 3,3',5,5'-tetramethyl-4,4'-methylene dianiline (TMMDA) wherein the molar ratio of said TMMDA to the mixture of said DSDA, said BTDA, and said PMDA is 100:100.

3. The asymmetric hollow fiber membrane of claim 1 wherein said polyimide is poly(3,3',4,4'-diphenylsulfone tetracarboxylic dianhydride-3,3',4,4'-benzophenone tetracarboxylic dianhydride-4,4'-oxydiphthalic anhydride-3,3',5,5'-tetramethyl-4,4'-methylene dianiline) derived from the condensation reaction of 3,3',4,4'-diphenylsulfone tetracarboxylic dianhydride (DSDA), 3,3',4,4'-benzophenone tetracarboxylic dianhydride (BTDA) and 4,4'-oxydiphthalic anhydride (ODPA) with 3,3',5,5'-tetramethyl-4,4'-methylene dianiline (TMMDA) wherein the molar ratio of said TMMDA to the mixture of said DSDA, said BTDA and said ODPA is 100:100.

4. A process for preparing a polyimide hollow fiber membrane comprising:
a) dissolving a polyimide comprising a plurality of repeating units of formula (I) in a mixture of solvents to form a hollow fiber spinning dope,

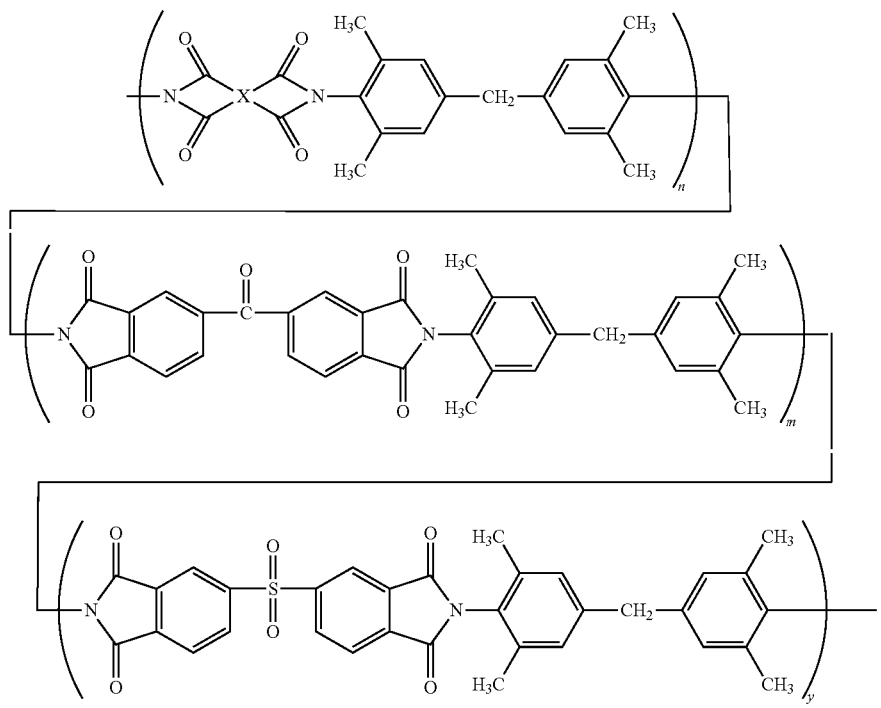

wherein X is selected from the group consisting of

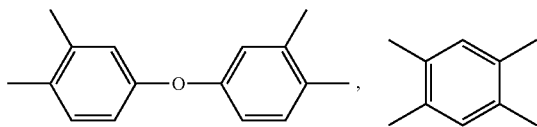

and mixtures thereof; and b) spinning said hollow fiber spinning dope and a bore fluid simultaneously from an annular spinneret to form a nascent hollow fiber, (c) immersing said nascent hollow fiber in a coagulant bath to produce a wet hollow fiber, (d) annealing said wet hollow fiber in a hot water bath at a temperature in a range of 70° to 100° C. for a certain time in a range of 10 minutes to 3 hours, (e) washing the said wet hollow fiber by a sequential solvent exchange, and (f) drying the said wet hollow fiber to produce a polyimide hollow fiber membrane.

5. The process of claim 4 wherein said hollow fiber spinning dope comprises a mixture of N-methylpyrrolidone and 1,3-dioxolane at a weight ratio of from about 99:1 to 50:50.

6. The process of claim 5 wherein said weight ratio is from about 95:5 to about 75:25.

7. A method of separating at least one gas from a mixture of gases comprising:

a) contacting an asymmetric hollow fiber polyimide membrane which is permeable to said at least one gas with said mixture of gases, wherein said asymmetric polyimide membrane is formed from a polyimide comprising a plurality of first repeating units of formula (I)

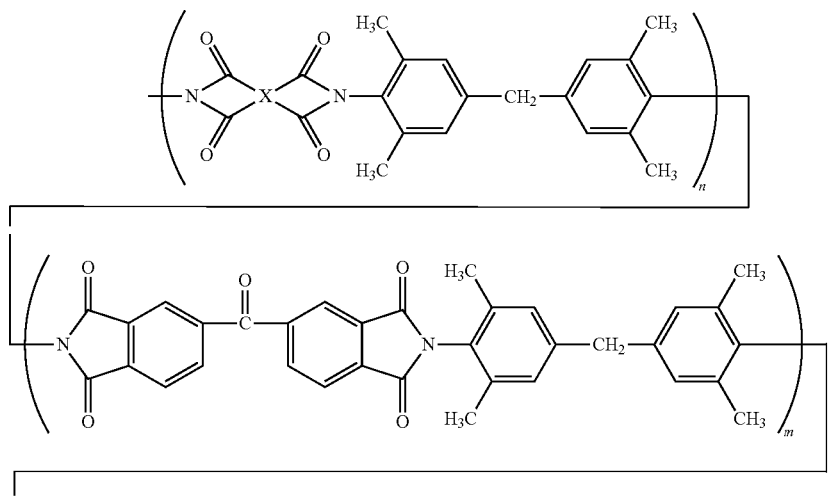

-continued

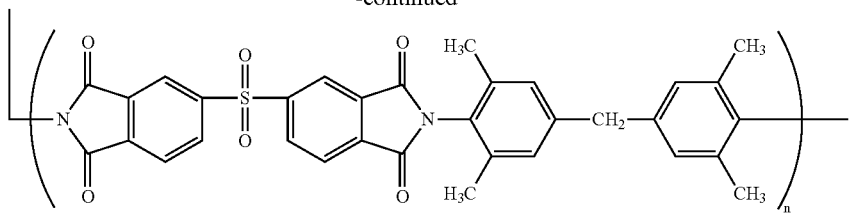

wherein X is selected from the group consisting of

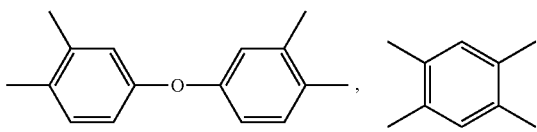

and mixtures thereof;

(b) contacting the mixture of gases on one side of said asymmetric polyimide membrane to cause said at least one gas to permeate the membrane; and (c) removing from the opposite side of said asymmetric polyimide membrane a permeate gas composition comprising a portion of said at least one gas which permeated said asymmetric polyimide membrane.

8. The method of claim 7 wherein said mixture of gases is selected from the group consisting of $CO_2/CH_4$, $CO_2/N_2$, $H_2/CH_4$, $H_2S/CH_4$, olefin/paraffin, and iso paraffins/normal paraffins.

9. The method of claim 7 wherein said mixture of gas comprises at least one volatile organic compound in an atmospheric gas.

10. The method of claim 7 wherein said mixture of gas comprises a mixture of hydrogen, nitrogen, methane and argon in an ammonia purge stream.

11. The method of claim 7 wherein said mixture of gas comprises hydrogen from a hydrocarbon vapor stream.

12. The method of claim 7 wherein said mixture of gas comprises a mixture of carbon monoxide, helium and methane.

13. The method of claim 7 wherein said, mixture of gas comprises natural gas comprising methane and at least one gas component selected from the group consisting of carbon dioxide, oxygen, nitrogen, water vapor, hydrogen sulfide, and helium.

14. The method of claim 7 wherein said mixture of gas comprises hydrocarbon gases, carbon dioxide, hydrogen sulfide and mixtures thereof.

15. The method of claim 7 wherein said mixture of gas comprises a mixture of organic molecules and water.

* * * * *